United States Patent
Johansson et al.

(10) Patent No.: US 12,328,708 B2
(45) Date of Patent: Jun. 10, 2025

(54) OPTIMIZATION OF TRACKING AREA LISTS FOR WIRELESS DEVICE PAGING

(71) Applicant: Telefonaktiebolaget LM Ericsson (publ), Stockholm (SE)

(72) Inventors: Åke Johansson, Pixbo (SE); Jesper Derehag, Kareby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 473 days.

(21) Appl. No.: 17/922,187

(22) PCT Filed: May 5, 2020

(86) PCT No.: PCT/SE2020/050456
§ 371 (c)(1),
(2) Date: Oct. 28, 2022

(87) PCT Pub. No.: WO2021/225481
PCT Pub. Date: Nov. 11, 2021

(65) Prior Publication Data
US 2023/0189216 A1    Jun. 15, 2023

(51) Int. Cl.
*H04W 68/04*    (2009.01)
(52) U.S. Cl.
CPC .................................. *H04W 68/04* (2013.01)
(58) Field of Classification Search
CPC .................................................... H04W 68/04
(Continued)

(56) References Cited

U.S. PATENT DOCUMENTS 8,855,668 B2    10/2014    Olsson et al.
9,380,553 B1     6/2016    Vivanco et al.
(Continued)

FOREIGN PATENT DOCUMENTS

CN    109635657 A    4/2019
EP     2320694 A1    5/2011
(Continued)

OTHER PUBLICATIONS

International Search Report and Written Opinion dated Mar. 5, 2021 for International Application No. PCT/SE2020/050456 filed on May 5, 2020, consisting of 11 pages.
(Continued)

*Primary Examiner* — Nghi H Ly
(74) *Attorney, Agent, or Firm* — Weisberg I.P. Law, P.A.

(57) ABSTRACT

A method for maintaining a tracking area list, TAL, associated with a first wireless device, WD, in a network having network nodes organized into tracking areas, TA, and arranged to page the first WD. The method includes obtaining data associated with a transition pattern of WDs between TAs in the network, the data being indicative of transition probabilities for WDs moving between the TAs, receiving a message indicating that the first WD is leaving a TA and is entering a current TA, and maintaining the TAL by adding the current TA to the TAL and selecting TAs neighboring the current TA for addition to the TAL based on the transition probabilities of a wireless device moving from the current TA and into neighboring TAs, a neighboring TA associated with high transition probability is selected for addition to the TAL before a neighboring TA associated with low transition probability.

20 Claims, 6 Drawing Sheets

(58) Field of Classification Search
USPC ............ 455/458, 432.1, 414.1, 418, 422.1
See application file for complete search history.

(56) References Cited

U.S. PATENT DOCUMENTS

| | | | |
|---|---|---|---|
| 2008/0102826 A1* | 5/2008 | Voyer .................. | H04W 68/02 455/432.1 |
| 2011/0096721 A1 | 4/2011 | Kamalaraj et al. | |
| 2011/0096731 A1* | 4/2011 | Kamalaraj ............ | H04W 48/18 370/329 |
| 2011/0294524 A1 | 12/2011 | Tontinuttananon et al. | |
| 2012/0148102 A1* | 6/2012 | Moriguchi .............. | G06T 7/277 382/103 |
| 2013/0183959 A1 | 7/2013 | Mihaly et al. | |
| 2013/0337797 A1* | 12/2013 | Ban ...................... | H04W 84/00 455/422.1 |
| 2014/0024407 A1 | 1/2014 | Yin et al. | |
| 2019/0182804 A1 | 6/2019 | Agarwal et al. | |

FOREIGN PATENT DOCUMENTS

| | | |
|---|---|---|
| EP | 2374314 A1 | 10/2011 |
| WO | 2010091266 A1 | 8/2010 |

OTHER PUBLICATIONS

3GPP TS 23.401 V16.6.0; 3rd Generation Partnership Project; Technical Specification Group Services and System Aspects; General Packet Radio Service (GPRS) enhancements for Evolved universal Terrestrial Radio Access Network (E-UTRAN) access (Release 16), Mar. 2020, consisting of 436 pages.
3GPP TS 24.301 V16.4.0; 3rd Generation Partnership Project; Technical Specification Group Core Network and Terminals; Non-Access-Stratum (NAS) protocol for Evolved Packet System (EPS); Stage 3 (Release 16), Mar. 2020, consisting of 573 pages.
3GPP TS 33.512 V16.2.0; 3rd Generation Partnership; Technical Specification Group Services and System Aspects; 5G Security Assurance Specification (SCAS); Access and Mobility management Function (AMF) (Release 16), Mar. 2020, consisting 18 pages.
European Search Report dated Mar. 31, 2023 for Application No. 20934568.5 consisting of 10 pages.
SA WG2 Meeting #116BIS S2-164693; Revision of S2-16xxxxTitle: Mobility mode based mobility management; Source: Huawei, HiSilicon; Document for: Discussion and Approval; Agenda Item: 6.10.3; Work Item / Release FS_NextGen/Rel-14; Location and Date: Aug. 29-Sep. 2, 2016, Sanya, P.R. China, consisting of 5 pages.

* cited by examiner

|      | TA1         | TA2         | TA3         | TA4         |
|------|-------------|-------------|-------------|-------------|
| TA1  | -           | 13 (0.265)  | 2 (0.041)   | 34 (0.694)  |
| TA2  | 10 (0.238)  | -           | 24 (0.571)  | 8 (0.190)   |
| TA3  | 0 (0.000)   | 19 (0.559)  | -           | 15 (0.441)  |
| TA4  | 30 (0.556)  | 7 (0.130)   | 17 (0.315)  | -           |

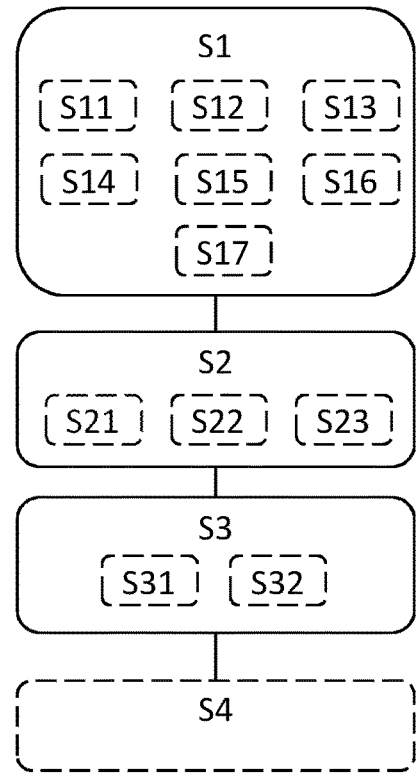
FIG. 9
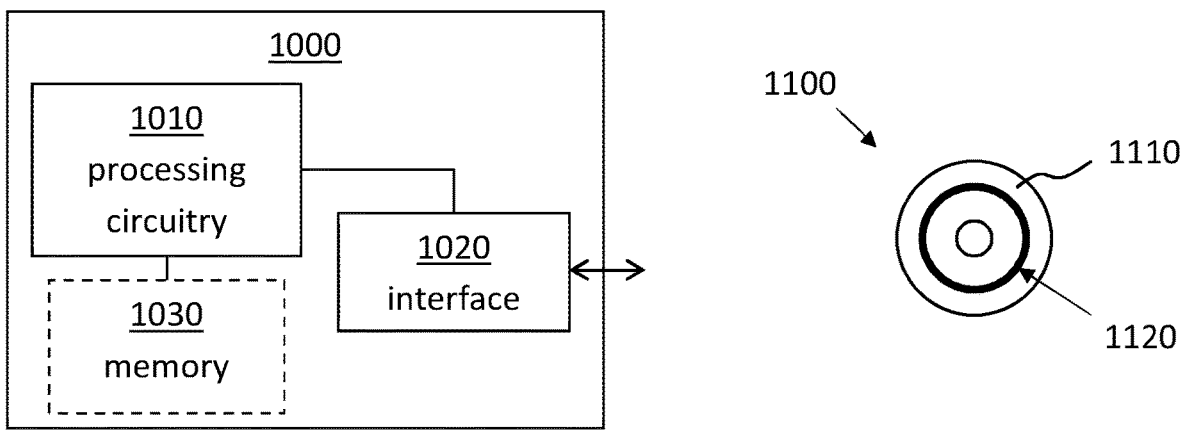
FIG. 10
FIG. 11

OPTIMIZATION OF TRACKING AREA LISTS FOR WIRELESS DEVICE PAGING

CROSS-REFERENCE TO RELATED APPLICATION

This application is a Submission Under 35 U.S.C. § 371 for U.S. National Stage Patent Application of International Application Number: PCT/SE2020/050456, filed May 5, 2020 entitled "OPTIMIZATION OF TRACKING AREA LISTS FOR WIRELESS DEVICE PAGING," the entirety of which is incorporated herein by reference.

TECHNICAL FIELD

The present disclosure relates to wireless access networks and in particular to procedures for paging a wireless device in idle mode. There are disclosed methods and network nodes configured to generate and to maintain tracking area lists for use in locating the wireless device during a paging procedure.

BACKGROUND

The third generation partnership project (3GPP) has defined wireless access networks and systems commonly known as fourth generation (4G) and fifth generation (5G) networks where access points known as eNodeBs and gNodeBs, respectively, provide wireless access between wireless devices and a core network.

The 3GPP wireless access networks, and also other types of access networks, implement an idle mode in which mode a wireless device can be configured when the wireless device is not actively connected to the network. Energy consumption by the wireless device is often at its lowest when the device is in idle mode, and network traffic associated with the wireless device is also low. In order to transmit or send substantial amounts of data, the wireless device leaves the idle mode and enters a connected mode where it is more active.

When a wireless device, for instance a piece of user equipment (UE), is in idle mode and needs to be reached by the network, the wireless device is paged. During paging, the network sends a signal to the wireless device requesting it to connect to the network. However, the network normally does not know exactly where the wireless device is, i.e., which access point to use to reach the wireless device, so it typically starts at some last known position and then tries a bigger and bigger area, i.e., covering more and more access points, until the wireless device receives the paging message and sends a response signal to the network.

The access points can be organized into tracking areas (TA), which TAs can then be organized into tracking area lists (TAL). A wireless device is associated with a current TA, e.g., the TA where the wireless device was last seen, and also with a TAL which comprises additional TAs close to the current TA which the wireless device may have entered unbeknownst to the network.

In case the wireless device is not discovered when paging the TA via access points in the current TA, access points in the TAL can be paged. Paging the wireless device over the TAL normally results in that the device is discovered since the wireless device is required to generate a tracking area update message (TAU) when leaving the TAL.

It is desired to generate and to maintain the TAL such that control signaling in the wireless access network is minimized. In particular, it is desired to reduce the number of TAUs sent by the wireless device to the network as it moves outside of the TAL.

U.S. Pat. No. 8,855,668 B2 exploits historical data associated with a wireless device when generating the TAL. However, further improvements are desired.

SUMMARY

It is an object of the present disclosure to provide a method for maintaining a tracking area list (TAL), associated with a first wireless device in a wireless access network. The wireless access network comprises network nodes arranged to page the first wireless device, wherein the network nodes are organized into tracking areas (TA). The method comprises obtaining data associated with a transition pattern of wireless devices between TAs in the wireless access network, wherein the data is indicative of transition probabilities for wireless devices moving between the TAs. The method also comprises receiving a message indicating that the first wireless device is leaving a TA and is entering a current TA. The method furthermore comprises maintaining the TAL by adding the current TA to the TAL and selecting TAs neighboring the current TA for addition to the TAL based on the transition probabilities of a wireless device moving from the current TA and into neighboring TAs, wherein a neighboring TA associated with high transition probability is selected for addition to the TAL before a neighboring TA associated with low transition probability.

This way of generating and maintaining the TAL is not only based on historical data for a given wireless device, but also predicts future motion patterns by the wireless device based on the transitions between TAs by other wireless devices. The proposed methods are computationally efficient since a few common transition probabilities can be used for a large number of wireless devices. Also a wireless device visiting an area for the first time can still be assigned a TAL in an efficient manner, since the motion patterns of other wireless devices moving in the area is used to generate the TAL.

A further advantage of the proposed methods is that, since a common transition model is used for a plurality of wireless devices, it becomes easier to anonymize the data, thereby providing an increased user integrity.

According to aspects, the TAL is configured to have a fixed length N, wherein the maintaining comprises selecting the N−1 neighboring TAs associated with the largest transition probabilities.

A fixed length TAL is easy to implement and to configure, which is an advantage. Preferably, the length N is greater than 1.

According to aspects, the TAL is configured to have a variable length. The maintaining then comprises selecting the neighboring TAs associated with the largest transition probabilities such that a sum of transition probabilities exceeds a pre-configured threshold. This variable length TAL increases configuration options to also comprise, e.g., setting a probability that a transition will give rise to an update of the TAL.

According to aspects, the obtaining comprises determining respective relative frequencies for each TA in the wireless access network of wireless devices exiting the TA to enter neighboring TAs, wherein the relative frequencies are indicative of the transition probabilities. The relative frequencies can be obtained in a computationally efficient manner, and the relative frequencies are also easy to anonymize.

The transition probabilities used in the method may be inferred in different ways based on different types of data. For instance, the method may comprise any combination of acquiring wireless device position data over time and inferring the transition probabilities from the wireless device position data, acquiring demographic data associated with a geographical region of the wireless access network and inferring the transition probabilities from the demographic data, obtaining the data in dependence of a time of day and/or weekday, and/or a date, and obtaining the data in dependence of a type of wireless device. Thus, the disclosed methods are versatile in that many different types of data can be used. The methods can also be made more accurate by combining several types of data and using more refined higher granularity data for better performance.

According to aspects, the method also comprises generating a Markov model of wireless device motion in the wireless access network, wherein the TAs correspond to Markov model states, and wherein the transition probabilities correspond to state transition probabilities of the Markov model. The Markov model can be made computationally efficient, which is an advantage, According to aspects, the method also comprises determining a home TA associated with the first wireless device and obtaining the data in dependence of the home TA. By associating wireless devices with a home TA, biasing effects related to wireless devices moving differently when close to home can be accounted for. This increases the accuracy of the models and therefore also improves the resulting TALs.

According to aspects, the method comprises receiving a message from the first wireless device indicating that the first wireless device is entering the current TA. This message may, e.g., be a tracking area update, TAU, message. This message generation is part of many wireless access network standards. It is an advantage that the herein disclosed methods are compatible with existing standards, such as the 3GPP 4G and 5G standards. According to aspects, the message is any of a service request message and/or a handover message transmitted from the wireless device to the network. Basically, any message originating from the wireless device and mentioning the current TA can be used in the methods discussed herein. This is an advantage, since more data generally improves the performance of these types of big data based methods.

There are also disclosed computer programs, systems, and network nodes associated with the above-mentioned advantages. In particular, there are disclosed both Mobility Management Entities (MME) and network nodes implementing Access and Mobility Functions (AMF).

BRIEF DESCRIPTION OF THE DRAWINGS

The present disclosure will now be described in more detail with reference to the appended drawings, where:

FIG. 9 shows a flowchart illustrating methods;
FIG. 10 schematically illustrates processing circuitry;
and
FIG. 11 shows a computer program product.

DETAILED DESCRIPTION

Figure 1:
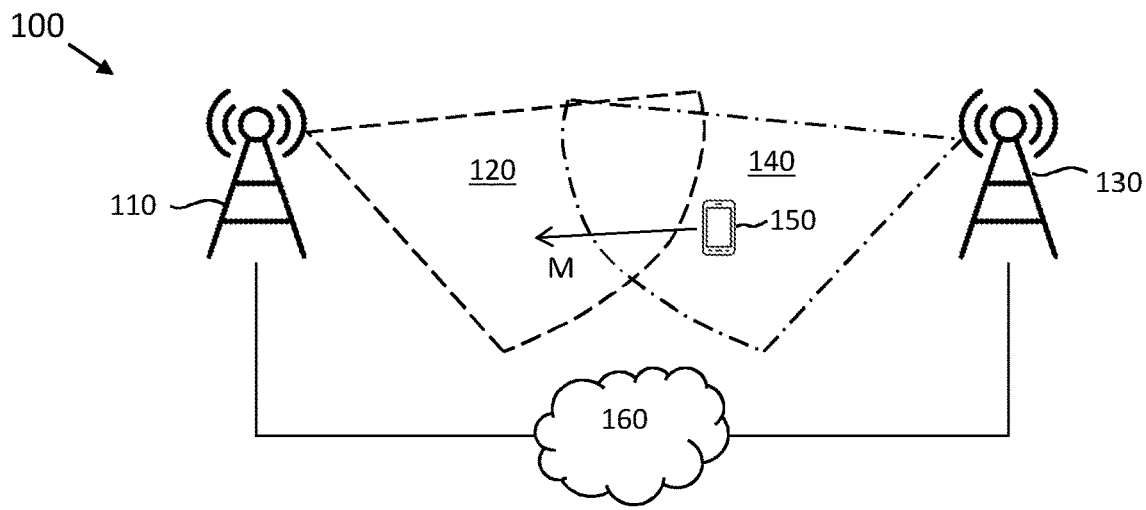
FIG. 1 shows an example wireless access network.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

FIG. 1 schematically illustrates a wireless access network 100 with access points 110, 130. A wireless device 150 moves M from the radio coverage region 140 of one access point into the coverage region of another access point 110.

The wireless access network comprises a core network 160 which provides various network functions. Among other things, the core network keeps track of the location of the wireless device 150. Thus, as the wireless device moves, the location information associated with the wireless device is updated.

The techniques disclosed herein will be exemplified mainly using network architectures defined by the third generation partnership project (3GPP). However, the present techniques are not limited to these particular types of networks but can be applied to any access network which provides wireless network access to wireless devices via access points organized into tracking areas. The techniques disclosed herein could, for example, be applied with advantage also in a network comprising one or more Wi-Fi access points.

Figure 2A:
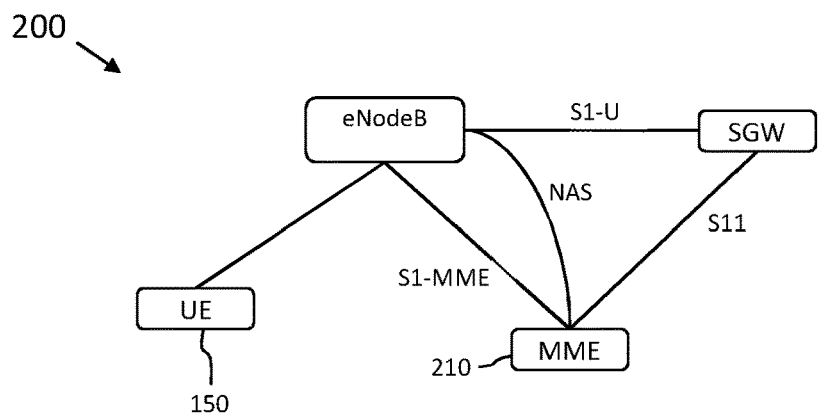
FIG. 2A-B schematically illustrate example wireless access network architectures.

FIG. 2A schematically illustrates part of a long term evolution (LTE) network 200, i.e., a 4G network. An access point in a 4G network is commonly referred to as an eNodeB. The mobility management entity (MME) is a node in the evolved packet core (EPC) which is responsible for idle mode wireless device paging and tagging procedures including retransmissions. It is involved in the bearer activation/deactivation process and is also responsible for choosing the serving gateway (SGW) for a wireless device at the initial attach and at time of intra-LTE handover involving Core Network (CN) node relocation. The Non-Access Stratum (NAS) signaling terminates at the MME and it is also responsible for generation and allocation of temporary identities to wireless devices.

3GPP TS 23.401 V 16.6.0 defines the architecture of the EPC for an LTE access.

3GPP TS 24.301 V 16.4.0 defines the protocol details of the NAS, where tracking areas are also discussed.

Figure 2B:
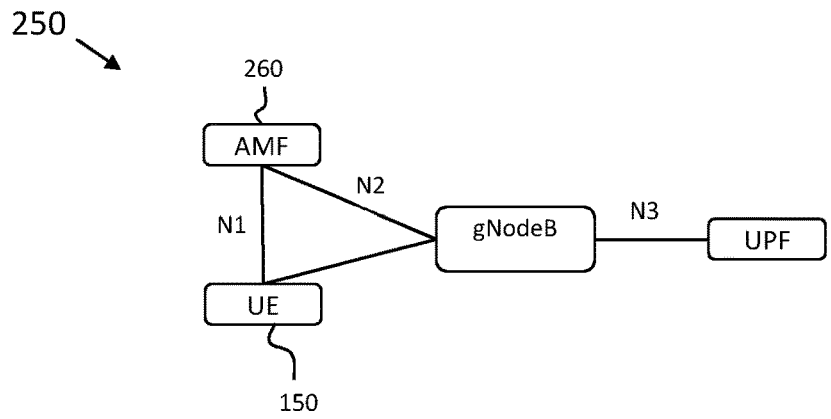

FIG. 2B shows some details of a 5G network. An access point in a 5G network is commonly referred to as a gNodeB. The gNodeB is connected to a user plane function (UPF) which handles data flow to and from the wireless device. A 5G Core Access and Mobility Management Function (AMF) receives connection and session related information from the wireless device 150 and is responsible for handling connection and mobility management tasks. A 5G network may comprise many AMF instances. a Globally Unique AMF Identifier (GUAMI) is therefore employed. The wireless device accessing the network specifies this in the first NAS message it sends to the network, which is routed to the required AMF by the Radio Access Network (RAN). Applicable to both 3GPP access and non-3GPP access, the GUAMI also ensures that messages from a wireless device, registered through both access networks, get forwarded to the same AMF. The Non-3GPP Interworking Function (N3IWF) is responsible for routing messages outside the 5G RAN.

3GPP TS 33.512 V 16.2.0 discusses details of the AMF.

Figure 3:
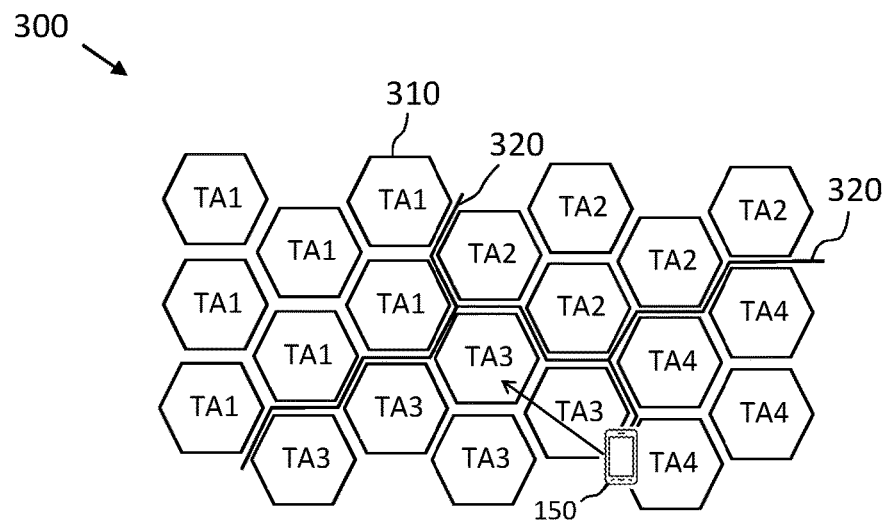
FIG. 3 illustrates access points organized into tracking areas.

FIG. 3 illustrates access points 310 organized into tracking areas (TA) 300. Tracking area borders 320 may be defined, e.g., by the network operator, to delimit the tracking areas. Thus, a tracking area is a collection of access points. Note that the collection of access points need not necessarily be deployed with coverage areas adjacent to each other, rather, one access point coverage area may be entirely comprised in the overage area of another access point. The current tracking area associated with a wireless device 150 is updated when it crosses the border between two tracking areas. A tracking area list (TAL) is maintained for each wireless device. The TAL comprises the current TA and also some neighboring TAs in which the wireless device may be found. The present disclosure focuses on the generation and updating of these TALs.

Figure 4:
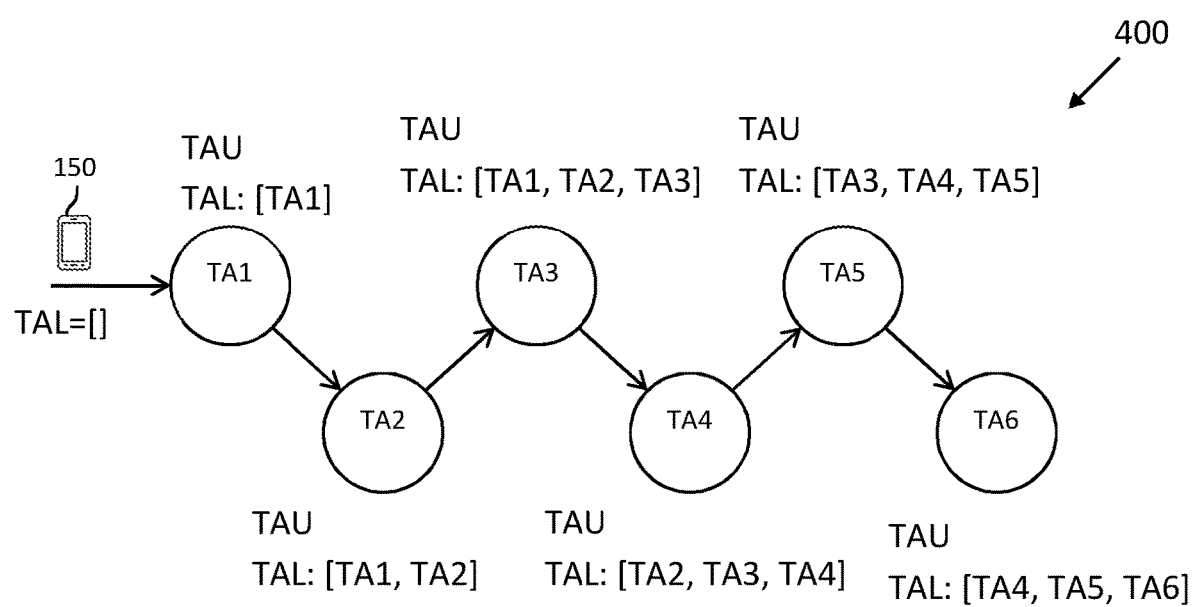
FIGS. 4-5 show examples of maintaining tracking area lists.

FIG. 4 illustrates a known method 400 for generating a TAL for a wireless device 150. The TAL is here of fixed length N=3, which means that the TAL can only contain up to three TAs. The TAL is first initialized to an empty list, TAL=[ ]. When the wireless device 150 moves into TA1, i.e., starts up, a TAU message is sent and the TAL is updated to comprise TA1, i.e., TAL:[TA1]. The wireless device 150 then traverses the network in order TA2, TA3, TA4, TA5, TA6. Each time the wireless device enters a new TA, a TAU message is generated, and the new TA is added to the TAL. It is appreciated that this approach to generating TAL generates a significant amount of signaling in the network, i.e., many TAUs and TAL updates.

Instead of only looking at past TAs which have been visited by the wireless device, it is proposed herein to also base the TAL on future TAs which the wireless device is likely to visit if and when it leaves the current TA. According to an example, a Markov model is used which is built based on a table of transition counts that is updated whenever a wireless device moves from one TA to another (not just the wireless device associated with the TAL, but any wireless device associated with the wireless access network). This count is easily converted to relative frequency, i.e., to values indicating a probability that the wireless device moves to a given neighboring TA as it exits the current TA. To compile a new TAL for a wireless device, the most likely TA:s given the known starting TA is selected for inclusion into the TAL. The TAL may be of fixed or variable length, as will be discussed in more detail below.

Figure 5:
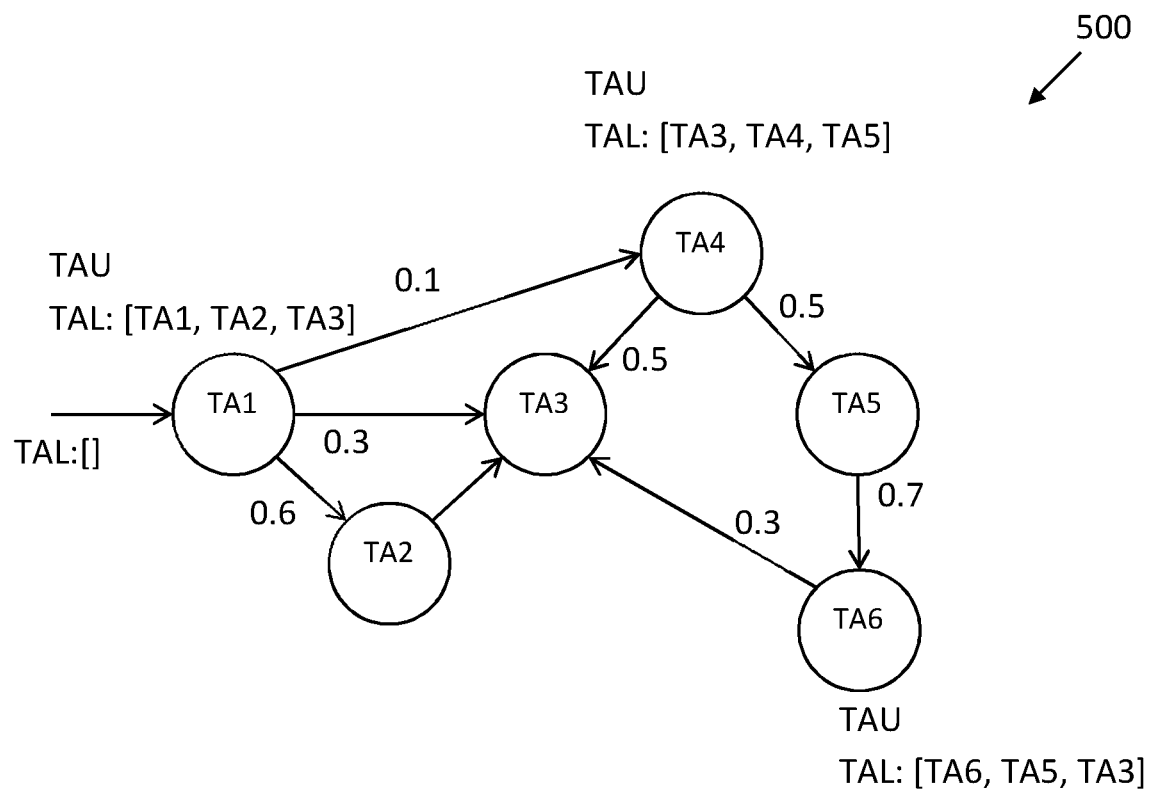

An example 500 of the proposed technique is shown in FIG. 5, where a TAL is of fixed length N=3. Here, motion patterns of wireless devices traversing the wireless access network have been analyzed a-priori in order to generate a model of transition probabilities in a TA transition model. For instance, a wireless device located in TA1 is six times more likely to enter TA2 compared to entering TA4. In the example in FIG. 5, the TAL always comprises the current TA and the most likely TAs to be entered by the wireless device based on the transition probabilities. Thus, a wireless device currently in TA1 will be associated with a TAL comprising also TA2 and TA3 since these are the most likely neighbors to be entered. No TAU will be generated unless the wireless device moves to TA4, in which case the new TAL will comprise TA3, TA4 and TA5 which represent the most likely transitions or a wireless device currently in TA4. A new TAL is then generated when the wireless device enters TA6. In comparison with the example 400 in FIG. 4, the number of generated TAUs have been reduced from six to three, which is a substantial improvement in the reduction of network signaling overhead.

The similarities between the example in FIG. 5 and a Markov model of wireless device motion in the wireless access network, where the TAs correspond to Markov model states, and wherein the transition probabilities correspond to state transition probabilities of the Markov model is noted. The theory underlying Markov models, such as two-step transition probabilities, can be advantageously used together with the current techniques. It is, however, appreciated that the techniques disclosed herein are not limited to Markov models. In fact, any transition model framework may be used with advantage. However, Markov models are normally computationally efficient, which is an advantage.

The model of transition probabilities is constructed for a large number of wireless devices and is also common for a large number of wireless devices. This is an advantage since only a few transition models are sufficient for the methods of generating the TAs. Thus, while each wireless device is associated with a respective TAL, the models used to generate those TALs can be shared between wireless devices. Another advantage is that a wireless device visiting an area for the first time can still be assigned a TAL in an efficient manner, since the database is constructed collectively.

To summarize, with reference also to FIG. 9, FIG. 5 shows an example of a method for maintaining a tracking area list (TAL) associated with a first wireless device 150 in a wireless access network 100, where the wireless access network 100 comprises network nodes 110, 130, 310 arranged to page the first wireless device 150. The network nodes 110, 130, 310 are organized into tracking areas, TA, 300. The method comprises obtaining S1 data associated with a transition pattern of wireless devices 150 between TAs in the wireless access network 100, wherein the data is indicative of transition probabilities for wireless devices moving between the TAs. The method also comprises receiving S2 a message indicating that the first wireless device is leaving a TA and is entering a current TA, and maintaining S3 the TAL by adding the current TA to the TAL and selecting TAs neighboring the current TA for addition to the TAL based on the transition probabilities of a wireless device moving from the current TA and into neighboring TAs, wherein a neighboring TA associated with high transition probability is selected for addition to the TAL before a neighboring TA associated with low transition probability.

The TAL in the example 500 is configured to have a fixed length N. The maintaining then comprises selecting S31 the N−1 neighboring TAs associated with the largest transition probabilities. This fixed length TAL may of course also comprise empty slots in case not enough neighbors exist to populate the list. Alternatively, the TAL can be configured to have a variable length. The maintaining then comprises selecting S32 the neighboring TAs associated with the largest transition probabilities such that a sum of transition probabilities exceeds a pre-configured threshold. For instance, a sufficient number of the highest probability TAs to reach an overall configurable probability value, i.e., a total probability of the wireless device moving into a TA in the TAL, or some other configurable value, can be selected.

The message indicating that the first wireless device is entering the current TA may be a message sent from the wireless device, or from some other network node having access to this information. For instance, some types of low complexity nodes, such as sensor nodes and the like, may be complemented by other control functions or master nodes which handle some functionality related to the smaller nodes, while other wireless devices handle these functions on their own. The message sent from the wireless device may be the tracking area update messages transmitted from the wireless device to the network as it traverses the network, but basically any message can be used for this function, such as a service request messages and/or handover messages transmitted from the wireless device 150 to the network 100.

An advantage of the proposed solution is that it saves TAU signaling, which in turn saves energy, hardware, and communications resources in terms of both bandwidth and time.

Figure 6:
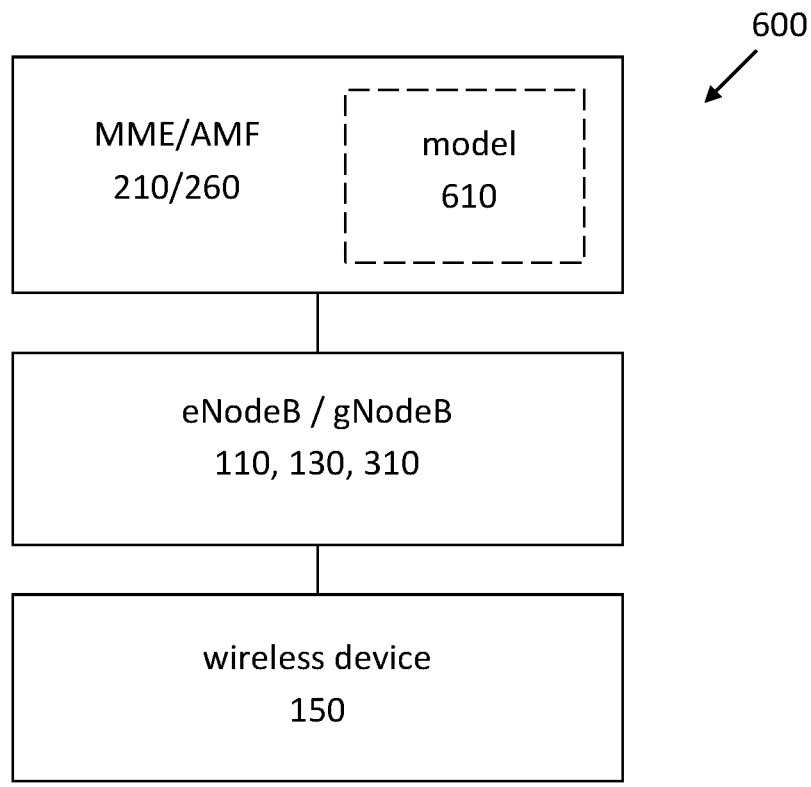
FIG. 6 schematically illustrates nodes in a wireless access network.

FIG. 6 illustrates nodes 600 in a wireless access network. The transition model 610 comprising the transition probabilities is comprised in the MME 210 in a 4G network and in the AMF 260 in a 5G network. A general account of the components of a network node will be discussed in more detail below in connection to FIG. 10.

Figure 7:
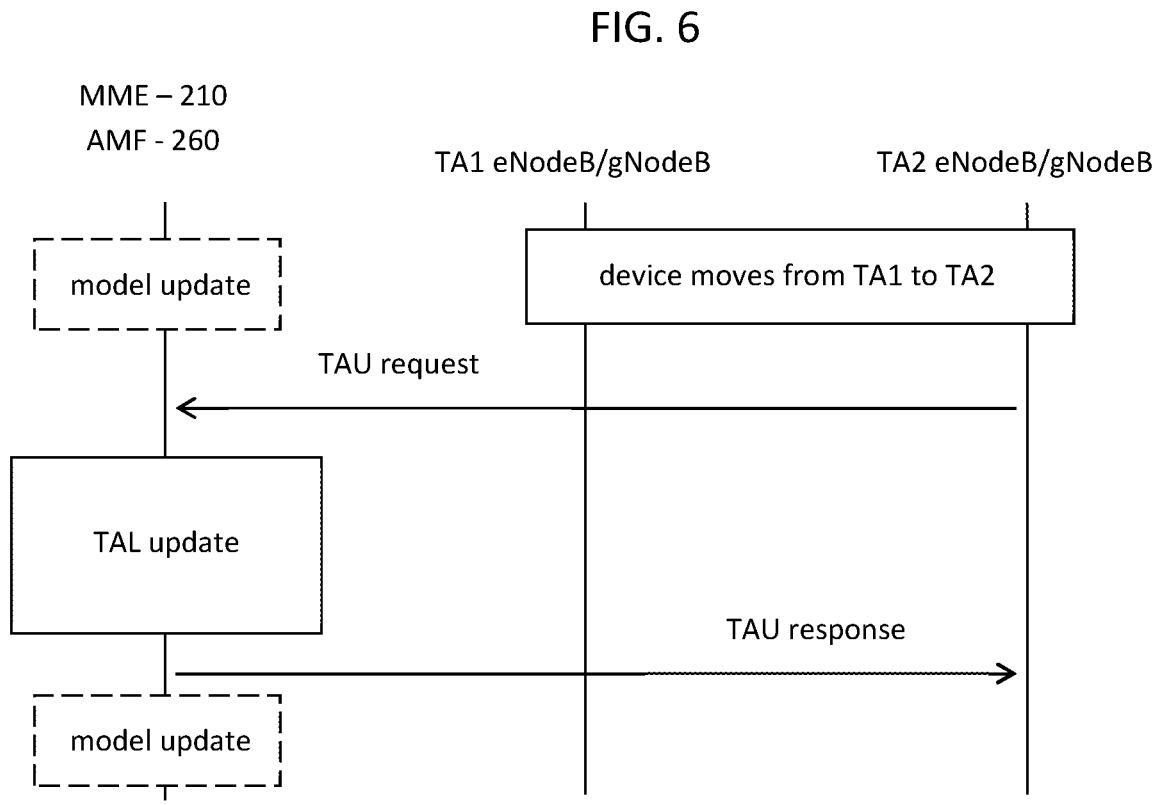
FIG. 7 shows a signaling diagram in a wireless access network.

FIG. 7 shows an example signaling diagram 700 of the proposed method. The diagram starts by the wireless device moving from TA1 to TA2. Suppose that TA2 is outside of the TAL associated with the wireless device. A TAU request is then generated and sent to the MME/AMF function which performs the TAL update according to the techniques disclosed herein. A TAU response is triggered when the update is complete. The model 610 is updated regularly based on information obtained from wireless devices traversing the network.

Figure 8:
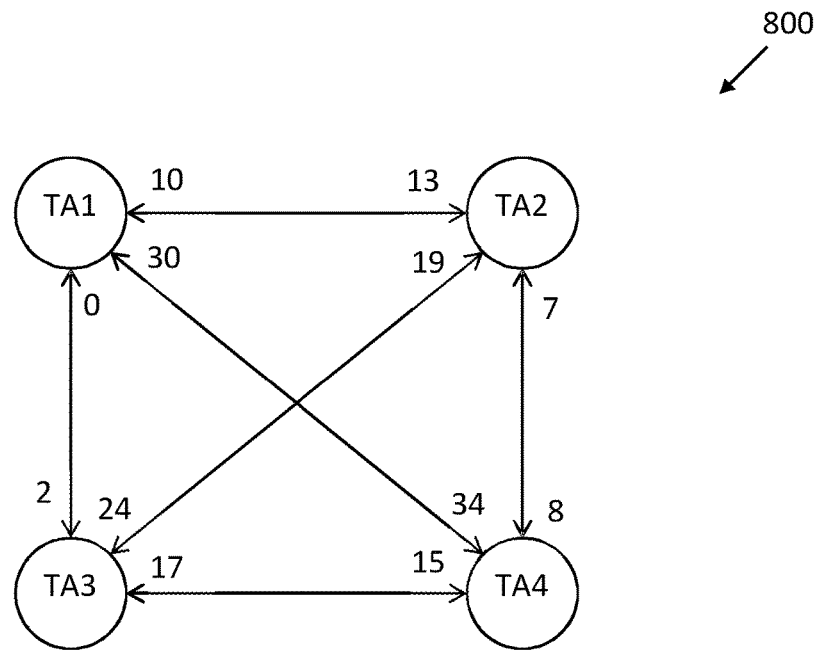
FIG. 8 illustrates example transition probabilities.

FIG. 8 illustrates one example of the determining of the transition probabilities for wireless devices moving between the TAs, which are then used in the model 610. Data associated with a transition pattern of wireless devices between TAs in the wireless access network may be of different types. One example are transition counts, as exemplified in FIG. 8. Every time a wireless device moves from one TA to another TA, a corresponding counting variable is increased by one. In the example of FIG. 8, 13 instances of wireless devices moving from TA1 into TA2 have been recorded, while no instances of a wireless device moving from TA3 into TA1 has been recorded. The transition data is indicative of transition probabilities for wireless devices moving between the TAs. These transition probabilities may, e.g., be modelled by relative transition frequencies as shown by the (rounded) numbers in parentheses. A transition frequency for a given transition is then the corresponding transition count divided by the total number of transitions for that TA. The relative frequencies are indicative of the above-mentioned transition probabilities. Note that the transition probabilities may be asymmetric, i.e., that the probability of going from a first TA to a second TA may be different from the probability of going in the other direction from the second TA back to the first. This may, e.g., be due to transportation system layouts. For instance, a large freeway may pass in a northwardly direction on one side of a mountain an in a southwardly direction on another side of the mountain, giving rise to such asymmetric transition probabilities.

Other types of information related to the wireless device and to the area in which the network is deployed can also be used to obtain information indicative of transition probabilities. For instance, many wireless devices regularly report their position to the network, and/or to servers that offer position-based services. The position of a wireless device may, e.g., be obtained from a global navigation satellite system (GNSS) such as GPS, or from other sources of position data. This position data can be used to determine the transition probabilities by monitoring wireless devices as they cross TA borders 320. The relative frequencies at which wireless devices leave one TA to enter another TA is indicative of transition probabilities. Thus, by acquiring wireless device position data over time the transition probabilities may be inferred from the shifts in the wireless device position data.

Some networks may experience significant differences in the transition probabilities over a single day, and also over the different days of the week. This may be due to that people are going to work in the morning and are coming back in the afternoon or evening. More than one set of transition probabilities may therefore be maintained in dependence of a time of day and/or weekday, and/or a date. The TAL is then generated based on the transition probability set corresponding to the current time of day, and/or date. In other words, the TAL may comprise more than one set of TAs, where each set of TAs is configured to be used for different times of day, and/or on different weekdays or dates. The data gathered on wireless device transitions between TAs may in this case need to be tagged with the time of day, date, or weekday.

The overall demographic data of a wireless access network may also be used to generate or to just refine the transition probabilities. At least for some networks, wireless devices are more likely to transition between densely populated areas. Thus, in some cases the transition probabilities may at least in part be inferred from demographic data. Transition probabilities which are generated based on demographic data may, e.g., be determined as a ratio of population densities or population count between the different neighboring TAs. Thus, if there are three TAs neighboring the current TA, an those three TAs have populations or population densities a, b, and c, then the transition probabilities can be generated, e.g., as a/(a+b+c), b/(a+b+c), and c/(a+b+c), respectively.

Some types of wireless devices move differently from other types of wireless devices. For instance, a transceiver arranged fixedly on a bus or other vehicle regularly following a fixed route is associated with different transition probabilities compared to a more general wireless device which moves more freely. The transition data may therefore be conditioned on the type of wireless device. This means that there will, optionally, be separate models maintained for different wireless device types. The gathered data on wireless device transitions between TAs may need to be tagged with the type of wireless device.

Wireless devices may also be associated with a 'home TA'. The transition data may then be obtained in dependence of the home TA. The transition probabilities may also be determined in dependence of the home TA. For instance, consider a first and a second tracking area arranged along a freeway. A wireless device is more likely to exit the freeway at its home TA than it is to exit the freeway at a TA neighboring the home TA.

The different methods of generating the model of transition probabilities for motion between TAs can of course be used in combination or separately. When used in combination, a weighting scheme may be considered where the different methods will have different impacts on the end model. These weights may be configured based on computer simulation or based on experimentation ion trial networks. The weights may also be adapted over time in a given network in order to optimize TAL maintenance.

FIG. 9 is a flow chart illustrating methods which summarize the above discussions. FIG. 9 illustrates a method for maintaining a tracking area list (TAL) associated with a first wireless device 150 in a wireless access network 100. The wireless access network 100 comprises network nodes 110, 130, 310 arranged to page the first wireless device 150. The network nodes 110, 130, 310 are organized into tracking areas (TA) 300. The method comprises obtaining S1 data associated with a transition pattern of wireless devices 150 between TAs in the wireless access network 100, wherein the data is indicative of transition probabilities for wireless devices moving between the TAs. The method also comprises receiving S2 a message indicating that the first wireless device is leaving a TA and is entering a current TA, and maintaining S3 the TAL by adding the current TA to the TAL and selecting TAs neighboring the current TA for addition to the TAL based on the transition probabilities of a wireless device moving from the current TA and into neighboring TAs, wherein a neighboring TA associated with high transition probability is selected for addition to the TAL before a neighboring TA associated with low transition probability.

Normally, the method also comprises paging S4 the first wireless device 150, wherein the paging is performed based on the maintained TAL.

According to aspects, the TAL is configured to have a fixed length N. The maintaining then comprises selecting S31 the N-1 neighboring TAs associated with the largest transition probabilities. The fixed length N is preferably greater than 1.

According to aspects, the TAL is configured to have a variable length. The maintaining then comprises selecting S32 the neighboring TAs associated with the largest transition probabilities such that a sum of transition probabilities exceeds a pre-configured threshold.

According to aspects, the obtaining comprises determining S11 respective relative frequencies for each TA in the wireless access network 100 of wireless devices exiting the TA to enter neighboring TAs. The relative frequencies are then indicative of the above-mentioned transition probabilities.

According to aspects, the obtaining comprises acquiring S12 wireless device position data over time and inferring the transition probabilities from the wireless device position data.

According to aspects, the obtaining comprises acquiring S13 demographic data associated with a geographical region of the wireless access network 100 and inferring the transition probabilities from the demographic data.

According to aspects, the method also comprises obtaining S14 the data in dependence of a time of day and/or weekday, and/or a date.

According to aspects, the method also comprises obtaining S15 the data in dependence of a type of wireless device.

According to aspects, the method comprises generating S16 a Markov model of wireless device motion in the wireless access network, wherein the TAs correspond to Markov model states, and wherein the transition probabilities correspond to state transition probabilities of the Markov model.

According to aspects, the method comprises determining S17 a home TA associated with the first wireless device 150 and obtaining the data in dependence of the home TA.

According to aspects, the method comprises receiving S21 a message from the first wireless device 150 indicating that the first wireless device is entering the current TA.

According to aspects, the message is a tracking area update, TAU, message S22.

According to aspects, the message is any of a service request message and/or a handover message transmitted from the wireless device to the network S23.

According to aspects, the method is performed in a Mobility Management Entity 210, MME, of a third generation partnership, 3GPP, defined wireless access network.

According to aspects, the method is performed in a network node 1000 implementing an Access and Mobility Function 260, AMF, of a third generation partnership, 3GPP, defined wireless access network.

According to aspects, the network nodes 110, 130, 310 organized into TAs comprise one or more eNodeB nodes and/or one or more gNodeB nodes in a 3GPP defined wireless access network.

FIG. 10 schematically illustrates, in terms of a number of functional units, the components of a network node 1000 according to an embodiment. Processing circuitry 1010 is provided using any combination of one or more of a suitable central processing unit (CPU), multiprocessor, microcontroller, digital signal processor (DSP), dedicated hardware accelerator, etc., capable of executing software instructions stored in a computer program product, e.g. in the form of a storage medium 1030. The processing circuitry 1010 may further be provided as at least one application specific integrated circuit (ASIC), or field programmable gate array (FPGA).

Particularly, the processing circuitry 1010 is configured to cause the network node 1000 to perform a set of operations, or steps. These operations, or steps, were discussed above in connection to the various radar transceivers and methods. For example, the storage medium 1030 may store the set of operations, and the processing circuitry 1010 may be configured to retrieve the set of operations from the storage medium 1030 to cause the network node 1000 to perform the set of operations. The set of operations may be provided as a set of executable instructions. Thus, the processing circuitry 1010 is thereby arranged to execute methods and operations as herein disclosed.

The storage medium 1030 may also comprise persistent storage, which, for example, can be any single one or combination of magnetic memory, optical memory, solid state memory or even remotely mounted memory.

The network node 1000 may further comprise a communications interface 1020 for communications with at least one other unit. As such, the interface 1020 may comprise one or more transmitters and receivers, comprising analogue and digital components and a suitable number of ports for wired or wireless communication.

The processing circuitry 1010 is adapted to control the general operation of the network node 1000 e.g. by sending data and control signals to the external unit and the storage medium 1030, by receiving data and reports from the external unit, and by retrieving data and instructions from the storage medium 1030. Other components, as well as the related functionality, of the network node 1000 are omitted in order not to obscure the concepts presented herein.

FIG. 10 schematically illustrates a network node 1000, comprising processing circuitry 1010, a network interface 1010 coupled to the processing circuitry 1010, and a memory 1030 coupled to the processing circuitry 1010, wherein the memory comprises machine readable computer program instructions that, when executed by the processing circuitry, causes the network node to perform operations according to the discussion herein.

According to some aspects, the network node comprises a mobility management entity (MME) 210.

According to some other aspects, the network node is configured to implement an Access and Mobility Function 260 (AMF).

FIG. 11 shows a computer program product 1100 comprising computer executable instructions 1120, i.e., a computer program, arranged on a computer readable medium 1110 to execute any of the methods disclosed herein. The computer program 1120 comprises program code means for performing the steps of any method disclosed herein when said program is run on a computer or on the processing circuitry 1010 of the network node 1000.

The invention claimed is:

1. A method for maintaining a tracking area list, TAL, associated with a first wireless device in a wireless access network, the wireless access network comprising network nodes arranged to page the first wireless device, the network nodes being organized into tracking areas, TA, the method comprising:
obtaining data associated with a transition pattern of wireless devices between TAs in the wireless access network, the data being indicative of transition probabilities for wireless devices moving between the TAs;
receiving a message indicating that the first wireless device is leaving a TA and is entering a current TA; and
maintaining the TAL by adding the current TA to the TAL and selecting TAs neighboring the current TA for addition to the TAL based on the transition probabilities of a wireless device moving from the current TA and into neighboring TAs, a neighboring TA associated with high transition probability being selected for addition to the TAL before a neighboring TA associated with low transition probability.

2. The method according to claim 1, wherein the TAL is configured to have a fixed length N, wherein the maintaining comprises selecting the N−1 neighboring TAs associated with the largest transition probabilities.

3. The method according to claim 1, wherein the TAL is configured to have a variable length, wherein the maintaining comprises selecting the neighboring TAs associated with the largest transition probabilities such that a sum of transition probabilities exceeds a pre-configured threshold.

4. The method according to claim 1, wherein the obtaining comprises determining respective relative frequencies for each TA in the wireless access network of wireless devices exiting the TA to enter neighboring TAs, wherein the relative frequencies are indicative of the transition probabilities.

5. The method according to claim 1, wherein the obtaining comprises acquiring wireless device position data over time and inferring the transition probabilities from the wireless device position data.

6. The method according to claim 1, wherein the obtaining comprises acquiring demographic data associated with a geographical region of the wireless access network and inferring the transition probabilities from the demographic data.

7. The method according to claim 1, comprising obtaining the data in dependence of a time of one or more of a day, a weekday, and a date.

8. The method according to claim 1, comprising obtaining the data in dependence of a type of wireless device.

9. The method according to claim 1, comprising generating a Markov model of wireless device motion in the wireless access network, wherein the TAs correspond to Markov model states, and wherein the transition probabilities correspond to state transition probabilities of the Markov model.

10. The method according to claim 1, comprising determining a home TA associated with the first wireless device, and obtaining the data in dependence of the home TA.

11. The method according to claim 1, comprising receiving a message from the first wireless device indicating that the first wireless device is entering the current TA.

12. The method according to claim 11, wherein the message is one or more of a tracking area update, TAU, message, a service request message and a handover message transmitted from the wireless device to the network.

13. The method according to claim 1, performed in one of:
a Mobility Management Entity, MME, of a third generation partnership, 3GPP, defined wireless access network; or
a network node implementing an Access and Mobility Function, AMF, of a third generation partnership, 3GPP, defined wireless access network.

14. The method according to claim 13, further comprising paging the first wireless device, wherein the paging is performed based on the maintained TAL.

15. A non-transitory computer storage medium storing a computer program comprising program code for performing a method for maintaining a tracking area list, TAL, associated with a first wireless device in a wireless access network, the wireless access network comprising network nodes arranged to page the first wireless device, the network nodes being organized into tracking areas, TA, when the computer program is run on a computer or on processing circuitry of a network node, the method comprising: obtaining data associated with a transition pattern of wireless devices between TAs in the wireless access network, the data being indicative of transition probabilities for wireless devices moving between the TAs; receiving a message indicating that the first wireless device is leaving a TA and is entering a current TA; and maintaining the TAL by adding the current TA to the TAL and selecting TAs neighboring the current TA for addition to the TAL based on the transition probabilities of a wireless device moving from the current TA and into neighboring TAs, a neighboring TA associated with high transition probability being selected for addition to the TAL before a neighboring TA associated with low transition probability.

16. A network node, comprising:
processing circuitry;
a network interface coupled to the processing circuitry; and
a memory coupled to the processing circuitry, the memory comprising machine readable computer program instructions that, when executed by the processing circuitry, causes the network node to perform operations of:
obtaining data associated with a transition pattern of wireless devices between TAs in the wireless access network, the data being indicative of transition probabilities for wireless devices moving between the Tas;
receiving a message indicating that the first wireless device is leaving a TA and is entering a current TA; and
maintaining the TAL by adding the current TA to the TAL and selecting TAs neighboring the current TA for addition to the TAL based on the transition probabilities of a wireless device moving from the current TA and into neighboring TAs, a neighboring TA associated with high transition probability being selected for addition to the TAL before a neighboring TA associated with low transition probability.

17. The network node according to claim 16, wherein the machine readable computer program instructions also cause the network node to page the first wireless device, wherein the paging is performed based on the maintained TAL.

18. The network node according to claim 16, wherein the TAL is configured to have a fixed length N, wherein the maintaining comprises selecting the N−1 neighboring TAs associated with the largest transition probabilities.

19. The network node according to claim 16, wherein the network node is configured to implement an Access and Mobility Function, AMF.

20. The network node according to claim 16, wherein the TAL is configured to have a variable length, wherein the maintaining comprises selecting the neighboring TAs associated with the largest transition probabilities such that a sum of transition probabilities exceeds a pre-configured threshold.

* * * * *